United States Patent [19]

Lubianez et al.

[11] Patent Number: 4,656,087
[45] Date of Patent: Apr. 7, 1987

[54] DIELECTRIC IMAGING SHEET THROUGH ELIMINATION OF MOISTURE INDUCED IMAGE DEFECTS

[75] Inventors: Ronald P. Lubianez, Fitchburg; Everett W. Bennett, Easthampton, both of Mass.

[73] Assignee: James River Graphics, South Hadley, Mass.

[21] Appl. No.: 817,663

[22] Filed: Jan. 10, 1986

[51] Int. Cl.$^4$ .................. B32B 5/16; G03G 13/00
[52] U.S. Cl. ........................... 428/323; 427/219; 427/220; 427/221; 428/330; 428/331; 428/405; 428/407; 428/447; 430/31; 430/52
[58] Field of Search ................ 427/219, 220, 221; 428/323, 330, 331, 447, 405, 407; 430/31, 52

[56] References Cited

U.S. PATENT DOCUMENTS

| | | | |
|---|---|---|---|
| 3,944,705 | 3/1976 | Fujioka et al. | 427/121 |
| 4,085,236 | 4/1978 | Ishibashi et al. | 427/219 |
| 4,141,751 | 2/1979 | Moreland | 427/219 |
| 4,374,178 | 2/1983 | Kulkarni et al. | 428/331 |

*Primary Examiner*—James C. Cannon
*Attorney, Agent, or Firm*—Burns, Doane, Swecker & Mathis

[57] ABSTRACT

Provided is a dielectric imaging sheet useful in electrographic imaging, wherein a particulate solid incorporated into the dielectric coating has been treated with an acyloxy or amino terminated polysiloxane. Short-chain polysiloxanes, e.g., 3 to 8 siloxane units, are preferred as the treating agent, with the amino group being preferably lower alkyl substituted and the acyloxy group being preferably lower acyloxy. Use of the specially treated particulate solid reduces moisture induced imaging defects upon using the dielectric sheet in electrographic imaging.

24 Claims, No Drawings

DIELECTRIC IMAGING SHEET THROUGH ELIMINATION OF MOISTURE INDUCED IMAGE DEFECTS

BACKGROUND OF THE INVENTION

1. Field of the Invention

The present invention relates to dielectric imaging sheets, and particularly dielectric imaging sheets useful in electrographic imaging wherein a particulate solid, e.g., a filler, is present in the dielectric layer of the imaging sheet. The present invention also relates to an electrographic imaging process using such a dielectric imaging sheet.

2. Description of the Prior Art

Dielectric imaging sheets for use in electrographic imaging are well known. Generally, the dielectric sheets comprise a dielectric layer which contains a solid particulate. The particulate material can be organic or inorganic. Several reasons are described in the prior art for adding such particulate material to the dielectric coating. For example, the particulate solid material can be added as an antiblocking agent, matting agent, or simply as a filler material to reduce the volume of resin needed for the dielectric coating. Suitable solid particulates, of any desirable particle size distribution, can be chosen from such materials as titanium dioxide, calcium carbonate, lithopone, clay, talc, silica, starch or wax.

A drawback to using such particulate solids, and especially amorphous silica, is that moisture adsorbs readily to the surface of the particulate solid. The moisture on the particle surface serves as a site for a short circuit in a nib or stylus type electrographic printer/plotter. As one stylus is short circuited, the available current to surrounding multiplexed styli is diminished, thereby transferring little or no charge to the dielectric sheet in the area of the short circuited styli. The visual effect of such an area that has been developed with liquid toner is one of low or no density. In solid black areas, the defects appear as short white lines perpendicular to the machine direction.

The provision of a dielectric imaging sheet which would be free of such potential imaging defects would be of great importance to the art. The elimination of such defects would greatly enhance the commercial viability of the dielectric imaging sheet, as well as its use in electrographic imaging processes.

Accordingly, it is an object of the subject invention to provide a novel dielectric imaging sheet which substantially precludes moisture induced image defects.

Another object of the subject invention is to provide a novel dielectric imaging sheet which has a particulate solid incorporated in the dielectric layer, which solid has been specially treated.

Still another object of the subject invention is to provide a novel dielectric imaging sheet useful in electrographic imaging and which has a particulate solid incorporated in the dielectric layer, which solid absorbs very little water.

Yet another object of the subject invention is to provide an electrographic imaging process which utilizes such a dielectric imaging sheet.

Still another object of the present invention is to provide a process for formulating such a dielectric imaging sheet.

These and other objects, as well as the scope, nature and utilization of the invention, will be apparent to those skilled in the art from the following description and the appended claims.

SUMMARY OF THE INVENTION

In accordance with the foregoing objectives, the subject invention provides a dielectric imaging sheet useful in electrographic imaging, wherein a particulate solid incorporated into the dielectric coating has been treated with an acyloxy or amino terminated polysiloxane. Short-chain polysiloxanes, e.g., from 3 to 8 siloxane units, are preferred as the treating agent, with the amino group being preferably lower alkyl substituted, e.g., having from 1 to 4 carbons, and the acyloxy group being preferably lower acyloxy, e.g., from 1 to 4 carbons. It has been found that use of the foregoing treating agents surprisingly provides a useful particulate solid which reduces moisture induced imaging defects related to the hydrophilicity of the partculate solid upon using the imaging sheet in electrographic imaging.

In another embodiment of the subject invention, there is provided an electrographic imaging process employing a dielectric imaging sheet having a particulate solid incorporated in the dielectric layer, the particulate solid having been treated with an acyloxy or amino terminated polysiloxane.

DETAILED DESCRIPTION OF THE PREFERRED EMBODIMENTS

The subject invention relates to a dielectric imaging sheet, and an electrographic imaging process using such a sheet, wherein a particulate solid has been incorporated into the dielectric coating. The improvement of the subject invention relates to a treatment of the particulate solid with an acyloxy or amino terminated polysiloxane in order to reduce moisture induced imaging defects. For it has been surprisingly found that when the particulate solid incorporated into the dielectric coating, which can be added as an antiblocking agent, matting agent, or simply a filler to reduce the volume of resin needed, has been treated with an acyloxy or amino terminated polysiloxane in accordance with the present invention, moisture induced image defects are essentially eliminated, or at least greatly reduced. Problems with moisture induced image defects have been particularly prevalent when amorphous silica has been used, either alone or in combination with other particulate solids or pigments. Yet, upon treatment of the amorphous silica with an acyloxy or amino terminated polysiloxane in accordance with the subject invention, such moisture induced imaging defects are greatly reduced.

The compounds employed in treating the particulate solid in accordance with the present invention are acyloxy or amino terminated polysiloxanes. The polysiloxane is preferably a short chain polysiloxane, i.e., having from 3 to about 8 siloxane units. It is most preferred that the polysiloxane comprise from 3 to about 6 siloxane units. The acyloxy and amino groups cap or terminate each end of the polysiloxane molecule.

It is most preferred that the particulate solid has been treated with an amino terminated polysiloxane. The amine group is preferably a lower alkyl, i.e., from 1 to about 4 carbons, substituted amine. Thus, examples of suitable amino terminated polysiloxanes include $\alpha, \omega$-dimethylamino polydimethyl siloxane, $\alpha, \omega$-diethylamino polydimethyl siloxane and $\alpha, \omega$-dipropylamino polydimethyl siloxane. The most preferred substituent of the amino group is the methyl group due to the commercial availability of methyl amine substituted end capped polysiloxanes. In a most preferred embodiment, the amino terminated polysiloxane employed is α, ω-dimethylamino polydimethyl siloxane, i.e., a compound of the formula Me$_2$N(Me$_2$SiO)$_n$-Me$_2$SiONMe$_2$, wherein n is an integer from 3 to 6.

The acyloxy groups of the acyloxy terminated polysiloxanes are preferably lower acyloxys, i.e., having from 1 to 4 carbons. The most preferred acyloxy is the acetoxy group, with acetoxy polysiloxanes having from 3 to about 5 or 6 siloxane units being the preferred compounds, i.e., of the general formula a AcO(SiMe$_2$O)$_n$Ac, wherein n is an integer from 3 to 6.

The foregoing amino and acyloxy terminated polysiloxanes have been found uniquely suited in reducing moisture induced imaging defects upon treatment of the particulate solids to be used in the dielectric coating of a dielectric imaging sheet. Treatment of the particulate solids, such as silica, with the foregoing compounds can generally limit the water pick-up to about 1%, and reduces the water pick-up by 80 to 90% or greater as compared to untreated particulate solids. Such a reduction in water pick-up is particularly important for any substantial and commercially important realization of an improvement in moisture induced defects. Moreover, such results are particularly surprising in light of the fact that conventional silanes generally used in the treatment of fillers to render the fillers hydrophobic are unsuccessful in achieving the objectives of the present invention. It has been found that only the foregoing particular terminated polysiloxanes effectively reduce and/or eliminate moisture induced image defects in dielectric imaging sheets.

The dielectric imaging sheet is generally comprised of up to four layers. Such dielectric imaging sheets are commercially available and are conventional. The first layer or base layer of the sheet is generally paper or a polymer, such as polyester, polypropylene or polystyrene. The second layer, just above the base layer, is a bond or primer coat. The third layer is an ionically or electronically conductive layer and often is comprised of an ionically conductive polymer. Examples of such polymers are the quaternary ammonium salts of chloromethylated polystyrene, polystyrene sulfonic acid, salts of sulfonated polystyrene or poly(dimethyl diallyl ammonium chloride). The top layer of the dielectric sheet is a dielectric coating, and it is this coating which generally contains the particulate solids, which as noted previously, can be added for use as antiblocking agents, matting agents or simply fillers.

Among the particular solids employed in the dielectric coating is silica, and in particular amorphous silica. It has been found that in formulations of amorphous silica, in combination with other pigments, the formulations are particularly effective in providing the desirable physical and imaging properties of a dielectric imaging sheet. Thus, the presence of a silica in the dielectric layer as a particular solid is a most preferred embodiment of the present invention. Other particulate solids which may be present alone or in admixture with silica include titanium dioxide, calcium carbonate, lithopone, clay, talc, starch or wax.

The particulate solids are generally treated with the amine or acyloxy terminated polysiloxane compounds prior to incorporation into the dielectric coating. This treatment generally comprises simply dissolving the polysiloxane compounds in a suitable solvent. Conventional organic solvents such as toluene are examples of such suitable solvents. A particulate solid can then be added to the solvent/polysiloxane compound mixture. If desired, a particulate solid/solvent slurry can be made initially, with the polysiloxane compounds being added thereto. The amount of polysiloxane compound can vary greatly, with about a 1:1 weight ratio, with regard to the amount of particulate solid being treated, being a useful general guideline. This ratio will and can vary greatly, however, and the usefulness of the treatment should not be limited thereto. After mixing, the particulate solid is subsequently collected and dried to remove any residual solvent. Any suitable drying technique may be used, with simple hot air drying being preferred.

Once the particulate solid has been treated with the acyloxy or amino terminated polysiloxane, it can be incorporated into a dielectric coating formulation pursuant to conventional techniques. The formulation can then be used to coat a dielectric imaging sheet, which sheet can be utilized successfully in an electrographic imaging process with reduced moisture induced image defects.

A highly desirable one step method of incorporating the treated particulate solid into the dielectric coating formulation is the direct addition of a slurry comprised of particulate solid, solvent, and siloxane into a pre-mixed coating lacquer without isolating the dry treated particulate solid. This one step method eliminates the need for isolation of the treated particulate solid. The formulation is then used to coat a dielectric imaging sheet as before.

The following examples are given as specific illustrations of the present invention. It should be understood, however, that the specific details set forth in the examples are merely illustrative and in nowise limitative. All parts and percentages in the examples, and in the remainder of the specification, are by weight unless otherwise specified.

EXAMPLE 1

2.0 grams of a commercially available α, ω-dimethylamino polydimethyl siloxane was added to a mixture of 2.0 grams of an amorphous silica available under the trademark Syloid 74X5500, and about 50 grams of toluene. After stirring for approximately 2 hours, the silica particulate solid was collected and dried at 220° F. for 2 hours. In order to test the water pick-up of the silica, a sample was weighed and then exposed to air of 70% RH (relative humidity), and subsequently weighed. After about 14 hours at 70% RH (relative humidity) the treated silica increased in weight by only 1.5%. In comparison, untreated silica was also exposed for 14 hours at 70% RH, and increased in weight by 13.8%. Thus, the treated silica of the subject invention reduced the water pick-up by about 90%.

EXAMPLE 2

Amorphous silica available as Syloid 74X5500 and α, ω-dimethylamino polydimethyl siloxane were mixed in a one to one ratio with approximately 50 grams of toluene in order to make a slurry. The slurry was placed in a mixer for about 30 minutes and then centrifuged for about 30 minutes. Toluene and extra polysiloxane were then decanted off, with the coated/treated silica being subsequently dried at 100° C. for about 1 hour.

A standard formulation for a dielectric coating was then made and divided into two samples, one employing untreated silica, and the other employing silica which had been treated in accordance with the present invention, i.e., with the α, ω-dimethylamino polydimethyl siloxane. The dielectric coating samples were then equilibrated at 50% RH and 70° F. Over a period of 90 days, the samples were periodically imaged and the quantity of image defects were compared.

After 2 days, the samples that were formulated with untreated silica exhibited over 230% more defects than the imaged samples which were formulated with the silica that had been treated with the α, ω-dimethylamino polydimethyl siloxane.

After 3 months, the samples which contained treated silica continued to image well and exhibited a marked improvement in image quality compared to samples which contained untreated silica.

EXAMPLE 3

This example illustrates the use of an acetoxy terminated polysiloxane.

The acetoxy terminated polysiloxane was prepared by mixing 1691.1 grams of $(Me_2SiO)_4$ and 16.91 grams of triphenylphosphene oxide. To the mixture was then added 1356 grams of $SOCl_2$, with the mixture then being allowed to react at room temperature. The acetoxy product was then recovered by vacuum distillation at 10 mm of pressure mercury.

4.5 grams of the acetoxy terminated polysiloxane was added to a mixture of 3.0 grams of amorphous silica (Syloid 74X5500) in 50 grams of toluene. After stirring for 30 minutes the silica particulate solid was collected and dried for 1½ hours at 125° F. and 1 hour at 190° F. Samples of treated silica and untreated silica were weighed and then exposed to an atmosphere of 50% RH for 18 hours. The weight of the sample of untreated silica increased by 7.0% whereas the weight of the silica that had been treated with acetoxy terminated polysiloxane increased only 1.4%

EXAMPLE 4

A slurry comprised of 1000 grams of toluene, 25.5 grams of α, ω-dimethylamino polydimethyl siloxane and 51 grams of Syloid 74X5500 was added directly to a pre-mixed composition which contained 8 kgrams of toluene, 3.5 kgrams of dielectric resin and 290 grams of plasticizer. 153 grams of organic particulate solid and 1500 grams of toluene were further added to complete the coating formulation. Dielectric film samples coated with this composition exhibited the same marked improvement in image quality as samples which were coated with treated silica that had been isolated prior to completing the coating formulation.

COMPARATIVE EXAMPLE

In the present comparative example, various conventional treatment silanes, which are generally used in order to render a silica filler hydrophobic, were employed in the treatment of a silica. The treated silica was then formulated into a dielectric top coat, which was then imaged in order to note the moisture induced defects.

Two grams of amorphous silica available under the trademark Syloid 74X5500 were added to about 50 grams of toluene. With stirring for about 2 hours, a silane compound, either 2 or 3 grams thereof, was added to the mixture of silica and toluene. Subsequent to stirring, the silica was isolated via centrifugation and decantation, and then dried at 220° F. for 2 hours. The particular silane compound employed in each run, as well as the amount thereof, is noted below in the table.

Moisture adsorption was determined by weighing the dried silica on a watch glass and then subjecting the samples to 70% RH for 14 hours. The percent increase in weight of the treated silica was then noted and is listed below in the table.

TABLE

| Compound | Amt. (g.) | % Increase in Weight of Silica |
| --- | --- | --- |
| n-propyl trimethoxy silane | 3 g. | 5.62 |
| n-propyl trimethoxy silane | 2 g. | 7.21 |
| t-amyl triethoxy silane | 3 g. | 9.01 |
| t-amyl triethoxy silane | 2 g. | 8.91 |
| n-octyl trimethoxy silane | 3 g. | 4.71 |
| n-octyl trimethoxy silane | 2 g. | 4.69 |

As can be seen from the foregoing table, the n-propyl trimethoxy silane and n-octyl trimethoxy silanes were only somewhat effective in reducing the moisture uptake, i.e., by only 40–50%. The t-amyl triethoxy silane was essentially totally ineffective in reducing the moisture uptake. Such results are totally ineffective for a commercial product in the hopes of substantially eliminating moisture induced defects, as a reduction in moisture uptake of 80 to 90% or greater is required as a minimum. Only through treatment with the compounds of the subject invention is such a moisture uptake reduction realized, as shown specifically, for example, in Example 1.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A dielectric sheet useful in electrographic imaging, wherein the improvement comprises the sheet having a particulate solid in the dielectric coating, with the particulate solid having been treated with an acyloxy or an amine terminated polysiloxane.

2. The dielectric sheet of claim 1, wherein the polysiloxane is a short-chain polysiloxane.

3. The dielectric sheet of claim 2, wherein the polysiloxane is comprised of from 3 to 6 siloxane units.

4. The dielectric sheet of claim 1, wherein the polysiloxane is an acyloxy terminated polysiloxane.

5. The dielectric sheet of claim 4, wherein the acyloxy terminated polysiloxane is lower acyloxy.

6. The dielectric sheet of claim 5, wherein the acyloxy terminated polysiloxane is an acetoxy polysiloxane.

7. The dielectric sheet of claim 1, wherein the polysiloxane is an amine terminated polysiloxane.

8. The dielectric sheet of claim 7, wherein the polysiloxane is a lower alkyl substituted amine terminated polysiloxane.

9. The dielectric sheet of claim 8, wherein the polysiloxane is α, ω-dimethylamino polydimethyl siloxane.

10. The dielectric sheet of claim 1, wherein the particulate solid comprises silica.

11. A dielectric sheet useful in electrographic imaging, the sheet comprising a particulate solid comprised of silica, which solid has been treated with an acetoxy polysiloxane or α, ω-dimethylamino polydimethyl siloxane.

12. The dielectric sheet of claim 11, wherein the particulate solid has been treated with α, ω-dimethylamino polydimethyl siloxane.

13. An electrographic imaging process employing a dielectric sheet, wherein the improvement comprises a sheet having a particulate solid in the dielectric coating, with the particulate solid having been treated with an acyloxy or an amine terminated polysiloxane.

14. The electrographic imaging process of claim 13, wherein the polysiloxane is a short-chain polysiloxane.

15. The electrographic imaging process of claim 14, wherein the polysiloxane is comprised of from 3 to 6 siloxane units.

16. The electrographic imaging process of claim 13, wherein the polysiloxane is an acyloxy terminated polysiloxane.

17. The electrographic imaging process of claim 16, wherein the acyloxy terminated polysiloxane is lower acyloxy.

18. The electrographic imaging process of claim 17, wherein the acyloxy terminated polysiloxane is an acetoxy polysiloxane.

19. The electrographic imaging process of claim 13, wherein the polysiloxane is an amine terminated polysiloxane.

20. The electrographic imaging process of claim 19, wherein the polysiloxane is a lower alkyl substituted amine terminated polysiloxane.

21. The electrographic imaging process of claim 20, wherein the polysiloxane is α, ω-dimethylamino polydimethyl siloxane.

22. The electrographic imaging process of claim 13, wherein the particulate solid comprises silica.

23. A process for making a dielectric imaging sheet having a dielectric coating which is useful in electrographic imaging, wherein the improvment comprises incorporating a particulate solid into a dielectric coating formulation, with the particulate solid having been treated with an acyloxy or an amine terminated polysiloxane; and then coating the dielectric imaging sheet with the dielectric coating.

24. The process of claim 23, wherein a slurry of the particulate solid, polysiloxane and a solvent is introduced directly into a coating lacquer, which coating lacquer is then coated onto the dielectric sheet as the dielectric coating formulation.

* * * * *